(12) United States Patent
Moradi-Araghi et al.

(10) Patent No.: US 8,389,446 B2
(45) Date of Patent: Mar. 5, 2013

(54) SWELLABLE POLYMERS WITH HYDROPHOBIC GROUPS

(75) Inventors: Ahmad Moradi-Araghi, Bixby, OK (US); James H. Hedges, Bartlesville, OK (US); David R. Zornes, Bartlesville, OK (US); Riley B. Needham, Bartesville, OK (US); Huili Guan, Lawrence, KS (US); Jenn-Tai Liang, Lawrence, KS (US); Cory Berkland, Lawrence, KS (US); James P. Johnson, Bartlesville, OK (US); Min Cheng, Bartlesville, OK (US); Faye L. Scully, Bartlesville, OK (US)

(73) Assignees: ConocoPhillips Company, Houston, TX (US); University of Kansas, Lawrence, KS (US)

( * ) Notice: Subject to any disclaimer, the term of this patent is extended or adjusted under 35 U.S.C. 154(b) by 216 days.

(21) Appl. No.: 12/780,792

(22) Filed: May 14, 2010

(65) Prior Publication Data

US 2010/0292109 A1 Nov. 18, 2010

Related U.S. Application Data

(60) Provisional application No. 61/178,768, filed on May 15, 2009.

(51) Int. Cl.
*C09K 8/60* (2006.01)
*C09K 8/528* (2006.01)
*C09K 8/588* (2006.01)
*E21B 43/22* (2006.01)

(52) U.S. Cl. ........ 507/219; 507/224; 507/225; 507/903; 507/935; 166/270

(58) Field of Classification Search ............... 507/219, 507/225, 903, 935; 166/270
See application file for complete search history.

(56) References Cited

U.S. PATENT DOCUMENTS

| 4,059,552 | A | * | 11/1977 | Zweigle et al. | 524/555 |
| 4,535,098 | A | * | 8/1985 | Evani et al. | 521/149 |
| 6,454,003 | B1 | | 9/2002 | Chang et al. | |
| 6,729,402 | B2 | | 5/2004 | Chang et al. | |
| 6,984,705 | B2 | | 1/2006 | Chang et al. | |
| 7,300,973 | B2 | | 11/2007 | Chang et al. | |

OTHER PUBLICATIONS

U.S. Appl. No. 12/722,344, filed Mar. 11, 2010, Publication Date Sep. 16, 2010, Moradi-Araghi et al.
U.S. Appl. No. 12/780,792, filed May 14, 2010, Moradi-Araghi et al.
U.S. Appl. No. 12/797,402, filed Jun. 9, 2010, Moradi-Araghi et al.
U.S. Appl. No. 12/815,314, filed Jun. 14, 2010, Moradi-Araghi et al.
Yuping Wei and Fa Cheng, Synthesis and aggregates of cellulose-based hydrophobically associating polymer, Carbohydrate Polymers 68(4):734-739 (2007).
SPE 89413 (2004); Larry Eoff, Presentation at the 2004 SPE/DOE Fourteenth Symposium on Improved Oil Recovery held in Tulsa, Oklahoma, USA Apr. 17-24, 2004 SPE 89413 (2004).
SPE 113264 (2008); F. Aktas, Presentation at 2008 SPE/DOE Symposium on Improved Oil Recovery held in Tulsa, USA, Apr. 19-23, 2008.
SPE 99441 (2008); Dongmei Wang, Presentation at the 2006/SPE/DOE Symposium on Improved Oil Recovery, Tulsa, Apr. 22-26.
SPE 29008 (1995); K.C. Taylor, Presentation at the SPE International Symposium on Oilfield Chemistry held in San Antonio, TX, USA Feb. 14-17, 1995.

\* cited by examiner

*Primary Examiner* — Ling Choi
*Assistant Examiner* — Aiqun Li
(74) *Attorney, Agent, or Firm* — Boulware & Valoir

(57) ABSTRACT

The invention is directed to crosslinked water-soluble swellable polymers, methods for making same and their various uses. More particularly, the invention relates to a composition comprising expandable polymeric particles being made with 0.1-5% hydrophobic monomers and labile crosslinkers and stable crosslinkers, said particles mixed with a fluid. A particularly important use is as an injection fluid in petroleum production, where the expandable polymeric particles are injected into a well and when the heat and/or pH of the target zones in the formation cause degradation of the labile crosslinker and when the particle expands, the hydrophobic groups associate to form a hydrophobically associative polymer, thus diverting water to lower permeability regions and improving oil recovery.

26 Claims, No Drawings

SWELLABLE POLYMERS WITH HYDROPHOBIC GROUPS

CROSS-REFERENCE TO RELATED APPLICATIONS

This application claims priority to U.S. Provisional Application No. 61/178,768, filed May 15, 2009, and incorporated herein in its entirety.

FEDERALLY SPONSORED RESEARCH STATEMENT

Not applicable.

REFERENCE TO MICROFICHE APPENDIX

Not applicable.

FIELD OF THE INVENTION

The invention relates to crosslinked swellable polymers made with a small amount of hydrophobic monomers and methods for making and using same. A particularly important use is as drilling fluid in petroleum production, especially in enhanced oil recovery applications, but the swellable polymers may also be used in the hygiene and medical arts, packaging, agriculture, the cable industry, information technology, in the food industry, papermaking, use as flocculation aids, and the like.

BACKGROUND OF THE INVENTION

Water injection used in oil production is where water is injected into the reservoir to stimulate production. Water is injected for two reasons: 1. For pressure support of the reservoir (also known as voidage replacement). 2. To sweep or displace the oil from the reservoir, and push it towards an oil production well. Normally only 20% of the oil in a reservoir can be extracted, but water injection increases that percentage (known as the recovery factor) and maintains the production rate of a reservoir over a longer period of time.

However, sweep recovery is limited by the so-called "thief zones," whereby water preferentially travels through the more porous regions of the reservoirs, bypassing less permeable zones. One means of further improving recovery is to block thief zones with a polymer or other material, thus forcing water through the less permeable regions.

U.S. Pat. Nos. 6,454,003; 6,984,; 7,300,973 describe polymeric microparticles whose properties change in response to particular stimuli. These patents describe an expandable crosslinked polymeric particle having an average particle diameter of about 0.05 to 10 microns. The particle is highly crosslinked with two crosslinkers, one that is stable and a second that is labile. The excess crosslinking makes the initial particles quite small, allowing efficient propagation through the pores of a reservoir. On heating to reservoir temperature and/or at a predetermined pH or other stimuli, the reversible (labile) internal crosslinks break, allowing the particles to further expand by absorbing additional injection fluid, usually water.

The unique properties of this particle allows it to fill the high permeability zones—commonly called thief zones or streaks—and then be expanded so that the swollen particles block the thief zones and subsequent injections of fluid are forced to enter the remainder of the reservoir, more effectively sweeping the reservoir. However, the method is limited in practice because subsequent injections always remove some of the polymer. Thus the thief zones become washed out and again present the problem of allowing the injection fluid to avoid entering the less permeable zones.

The reason for the washout is not certain, but our research suggests that the swollen polymer is not in gel form, thus although viscous, is a liquid and can be washed out of the porous media.

Another possible sweep fluid includes the hydrophobically associative polymers or HAPs. The solution properties of water soluble polymers will change on inclusion of hydrophobic groups into the polymer chain, and the primary factor causing the change is the associative tendency between the hydrophobic portions of the polymer when placed in an aqueous medium. The association leads to higher viscosity, but the viscosity increase is generally reversible at high shear rates. In addition, hydrophobically associative polymers are more stable in salt solutions than the corresponding unmodified water soluble polymer. See e.g., SPE 89413, SPE 113264, SPE 99441, and SPE 29008 discussing HAPs, their synthesis and use in enhanced oil recovery. However, HAPs per se are thick on injection and thus tend to limit the rate of injection.

What is needed in the art is a swellable polymeric particle that is less susceptible to loss under the conditions of use, but that is easily injected with less pressure requirements. In particular, a swellable polymer that is resistant to washout by subsequent fluid injections is needed, but the polymers will have utility in any application where swellable polymers are desired.

SUMMARY OF THE INVENTION

The invention generally relates to polymeric particles being made with a certain amount of hydrophobic monomer and being highly crosslinked with stable and labile crosslinkers, allowing swelling in situ in response to a particular stimulus. Further, the swelled polymers then expose the hydrophobic groups which then associate with each other and form a hydrophobically associative polymer that is resistant to washout.

The described swellable polymers with hydrophobic groups are improved over hydrophobically associative polymers alone, which often plug the sand face or limit the rate of injection due to their large size and viscosity at injection. They are also improved over the swellable particle alone, which tend to washout. The combination instead provides a thin, injectable fluid, that greatly thickens in response to heat and pH after introduction to the reservoir and is more stable to washout.

Broadly speaking, a hydrophobically associative polymer consists of inter- and intra-molecular hydrophobic junctions, which generally act to increase viscosity at the same concentration of the corresponding conventional polymer. Studies indicate that average size of particle was increased from 54.7 nm to 73 nm and finally to 168.1 nm with the increase of concentration of hydrophobic monomer in the polymer from 0.04% to 0.1% and then to 0.2% (Yuping Wei and Fa Cheng, Synthesis and aggregates of cellulose-based hydrophobically associating polymer, Carbohydrate Polymers 68(4): 734-739 (2007)). Therefore, in order to form a stable hydrophobically associating polymer that is resistant to washout, at least 0.1 wt % hydrophobic monomer is required, and preferably 0.2%, 0.5%, 0.75%, 1% or even higher.

The polymer of the invention has particular use in enhanced oil recovery, as described above, and is preferably a generally hydrophilic polymer for this application, although having small amount of hydrophobic groups as discussed.

However, such polymers would find uses in all of the arts where swellable polymers are in current use and polymer loss is to be avoided, including as filler for diapers and other hygiene products, medical devices such as orthopedic insoles, ocular devices, and biomimetic implants, wipe and spill control agents, wire and cable water-blocking agents, ice shipping packs, controlled drug release, agricultural uses (e.g., soil additive to conserve water, plant root coating to increase water availability, and seed coating to increase germination rates), industrial thickeners, specialty packaging, tack reduction for natural rubber, fine coal dewatering, and the like.

Preferably, the polymeric particles of the invention comprise a highly crosslinked expandable polymeric particles having labile crosslinkers and stable crosslinkers, plus 0.1-5% hydrophobic monomer co-polymerized therewith.

A "stable crosslinker" is defined herein to be any crosslinker that is not degraded under the stimulus that causes the labile crosslinker to disintegrate. Representative stable crosslinking monomers include methylene bisacrylamide, diallylamine, triallylamine, divinyl sulfone, diethyleneglycol diallyl ether, and the like and combinations thereof. A preferred stable crosslinking monomer is methylene bisacrylamide.

The "labile crosslinker" is defined herein to be any crosslinker that decays or is reversible on application of a particular stimulus, such as irradiation, pH, temperature, etc. and combinations thereof. Representative labile crosslinkers include acrylate or methacrylate esters of di, tri, tetra hydroxy compounds including ethyleneglycol diacrylate, polyethyleneglycol diacrylate, trimethylopropane trimethacrylate, ethoxylated trimethylol triacrylate, ethoxylated pentaerythritol tetracrylate, and the like; divinyl or diallyl compounds separated by an azo such as the vinyl or allyl esters of di or tri functional acids, and combinations thereof. Preferred labile crosslinkers include water soluble diacrylates such as polyethlene glycol (PEG) 200-1000, especially PEG 200 diacrylate and PEG 400 diacrylate.

When percent (%) hydrophobic monomer or hydrophobic group is referred to herein means weight percent of the hydrophobic monomer/total monomer and crosslinker weight.

Combinations of multiple stable and labile crosslinkers can also be employed advantageously. Reaction to stimuli can also be controlled by labile crosslinker selection (and its concentration), as needed for particular reservoir conditions or for the application at issue. For example, judicious selection of labile crosslinkers—one that degrades at a very high temperature and another at a lower temperature—can affect the temperature and pH at which the microparticle swells.

Other crosslinkers include, but are not limited to, diacrylyl tertiary amides, diacrylylpiperazine, diallyltartardiamide (DATD), dihydroxyethylene-bis-acrylamide (DHEBA), bis-acrylylcystamine (BAC), trimethylolpropane trimethacrylate (TMPTMA), propyleneglycol triacrylate (PGTA), tripropyleneglycol diacrylate (TPGDA), allyl methacrylate (AMA), triethyleneglycol dimethacrylate (TEGDMA), tetrahydrofurfuryl methacrylate (TFMA) and trimethylolpropane triacrylate (TMPTA). Multifunctional crosslinkers include, but are not limited to, pentaerythritol triacrylate, 1,5 pentane diol dimethacrylate, and pentaerythritol triallylether.

"Hydrophobic monomer" is defined herein to be any monomer that causes the swellable polymer to hydrophobically associate across polymer chains. Generally, C8-C22 backbones are employed, but prior studies have shown that for brine stability, at least C16 is preferred.

Exemplary hydrophobic monomers include the higher alkyl esters such as octyl, decyl, dodecyl, tridecyl, tetradecyl, octadecyl, etc. of α,β-ethylenically unsaturated carboxylic acids, such as acrylates and methacrylates. Also included are alkyl esters derived from the reactions of alkanols having from 8 to 22 carbon atoms with ethylenically unsaturated carboxylic acids such as maleic anhydride, fumaric acid, itaconic acid and aconitic acid, alkylaryl esters of ethylenically unsaturated carboxylic acids such as nonyl-o-phenyl acrylate, nonyl-α-phenyl methacrylate, dodecyl-α-phenyl acrylate and dodecyl-α-phenyl methacrylate; N-alkyl, ethylenically unsaturated amides such as N-octadecyl acrylamide, N-octadecyl methacrylamide, N,N-dioctyl acrylamide and similar derivatives thereof; α-olefins such as 1-octene, 1-decene, 1-dodecene and 1-hexadecene; vinyl alkylates wherein alkyl has at least 8 carbons such as vinyl laurate and vinyl stearate; vinyl alkyl ethers such as dodecyl vinyl ether and hexadecyl vinyl ether; N-vinyl amides such as N-vinyl lauramide and N-vinyl stearamide; and alkyl aromatics such as t-butyl styrene or t-butyl phenyl.

When employed for enhanced oil recovery applications, the size range of the unexpanded particle will be selected to accord with the permeability characteristics of a given reservoir and increasing crosslinker provides smaller particles. Thus, the size is preferably about 0.05 to about 10 microns, or 1-3 microns, but the size can vary according to the needs of each application. Ranges as broad as 0.01 to about 100 microns, or sizes as high as 1000 microns can be acceptable. Further, in certain soil and spillage applications, the size can be up to a cm, though more preferably may be 1-5 mm. Generally speaking, the smaller particles will swell more quickly due to increased surface to volume ratio.

The proportion of stable to labile crosslinker can also vary depending on how much swelling on stimulus is required, but in the enhanced oil recovery applications a great deal of swelling is desired to effectively block the thief zones and increase the mobilization and/or recovery rate of hydrocarbon fluids present in the formations. Thus, the labile crosslinker greatly exceeds the stable crosslinker. To obtain sizes in the range of about 0.05 to about 10 microns suitable for injection fluid the crosslinker content is about 1,000-200,000 ppm of labile crosslinker and from 0-300 ppm of non-labile crosslinkers.

Representative nonionic monomers that can be used to make the swellable polymeric particles of the invention include acrylamide, N-isopropylacrylamide, N,N-dimethylacrylamide, N,N-diethylacrylamide, dimethylaminopropyl acrylamide, dimethylaminopropyl methacrylamide, acryloyl morpholine, hydroxyethyl acrylate, hydroxypropyl acrylate, hydroxyethyl methacrylate, hydroxypropyl methacrylate, dimethylaminoethylacrylate (DMAEA), dimethylaminoethyl methacrylate (DMAEM), maleic anhydride, N-vinyl pyrrolidone, vinyl acetate and N-vinyl formamide. Preferred nonionic monomers include acrylamide, N-methylacrylamide, N,N-dimethylacrylamide and methacrylamide. Acrylamide is more preferred.

Anionic, cationic or betaine monomers are not preferred, but amounts thereof can be incorporated.

Representative swellable polymers also include copolymers of acrylamide, 2-acrylamido-2-methyl propane sulfonic acid, sodium acrylate, and the like, each copolymerized with a small amount of hydrophobic monomer as described above.

The polymeric particles can be prepared by methods known in the art, including the inverse emulsion polymerization technique described in U.S. Pat. Nos. 6,454,003; 6,729,402; 6,984,705. Particle suspensions are prepared by mixing particles with injection fluid, or if present in an inverse emulsion adding surfactant and additional injection fluid if needed.

In addition to the polymeric particle containing two types of crosslinkers, and 0.1-5% hydrophobic groups, the injection fluid may also contain conventional additives as appropriate for the particular application.

In one embodiment the invention is composition comprising a fluid and expandable polymeric particles having 0.1-5% hydrophobic groups and that is highly crosslinked with both labile and stable crosslinkers. In another embodiment, the invention is a composition comprising expandable polymeric particles having 0.1-5% hydrophobic groups and labile crosslinkers and stable crosslinkers, so that the swelled particles can form hydrophobically associative polymers that are much larger (even gel like) and resist washout.

In another embodiment, the invention is a composition comprising highly crosslinked expandable polymeric particles having 0.1-5% hydrophobic groups and an unexpanded volume average particle size diameter of from about 0.05 to about 10 microns and a crosslinking agent content of from about 1,000 to about 200,000 ppm of labile crosslinkers and from 0 to about 300 ppm of stable crosslinkers, combined with an injection fluid.

In another embodiment, the invention is a method of increasing the recovery of hydrocarbon fluids in a subterranean formation by injecting into the subterranean formation a composition comprising a fluid, a highly crosslinked expandable polymeric particle having 0.1-5% hydrophobic groups, wherein polymeric particle has an unexpanded volume average particle size diameter of 0.05-10 microns and a crosslinker content of about 1,000-200,000 ppm of labile crosslinker and about 0-300 ppm of stable crosslinker, said polymeric particle has a smaller diameter than the pore throats of the subterranean formation, and said labile crosslinkers break under the conditions of temperature and pH in the subterranean formation to allow the polymeric particle to expand and said hydrophobic groups associate to form hydrophobically associative polymers that resist washout as compared with the unassociative polymer.

In preferred embodiments, the polymeric particles can be a copolymer of acrylamide and a C8-C22 ester of acrylate or methacrylate, the stable crosslinker can be methylene bisacrylamide, and the labile crosslinker can be a polyethlene glycol diacrylate. The hydrophobic monomer is preferably lauryl methacrylate or stearyl methacrylate. However, many other polymers, monomers and crosslinkers can be employed, as described herein.

DESCRIPTION OF EMBODIMENTS OF THE INVENTION

The invention provides a novel polymer that swells on a stimulus exposing hydrophobic groups that associate to form hydrophobically associative polymers. Such polymers have particular utility in sweeping reservoirs, but many uses are possible.

EXAMPLE 1

Prior Art

We ran a number of slim tube tests in which we injected about 1 pore volume of BRIGHTWATER® (NALCO™, copolymer of acrylamide and sodium AMPS crosslinked with methylene bis-acrylamide and PEGdiacrylate) particles into 40' slim tubes packed with sand. The sand pack was then heated (150-190° F.) to allow the polymer to swell. Afterwards, water was injected into the sand packs and the resistance to the flow of water measured. While the swelled polymers initially exhibited good resistance factors, this behavior appeared to washout with additional water injection. Typically within one pore volume of water injection the Residual Resistance Factor (RRF) dropped to a number about 1-2. This behavior was observed with slim tubes which were packed with 6.7 Darcy sand as well as 1 Darcy sand. Therefore, the treatment effects of porous media with these particles was only temporary.

EXAMPLE 2

Invention

Since the prior art polymer is subject to washout, we propose that when combined with sufficient hydrophobic monomers containing for example C8-C22 groups, the resulting swelled polymer will hydrophobically associate, thus resisting washout.

We propose to copolymerize acrylamide with a hydrophobic monomer, for example lauryl or stearyl methacrylate, at levels ranging from 0.2%, 0.5%, 1%, 1.5% 2% and/or 5% and highly crosslink the monomers with both labile and stable crosslinkers, as described above. On the addition of heat or change in pH, the labile crosslinkers will degrade, the microparticles swell, and the hydrophobic groups will begin to associate and result in a hydrophobically associative polymer that will resist washout.

Each of the following references are incorporated herein in their entirety.

U.S. Pat. Nos. 6,454,003; 6,729,402; 6,984,705

Yuping Wei and Fa Cheng, Synthesis and aggregates of cellulose-based hydrophobically associating polymer, Carbohydrate Polymers 68(4): 734-739 (2007).

SPE 89413 (2004), SPE 113264 (2008), SPE 99441 (2008), and SPE 29008 (1995).

What is claimed is:

1. A composition comprising expandable polymeric particles being made with 0.1-5 wt % hydrophobic monomer and labile crosslinkers and stable crosslinkers, said particles combined with a fluid, wherein said labile crosslinkers are about 200,000 ppm weight, and said stable crosslinkers are about 300 ppm weight.

2. The composition of claim 1, wherein the hydrophobic monomer contains C8-C22 alkanes.

3. The composition of claim 1, wherein the hydrophobic monomer comprises lauryl methacrylate or stearyl methacrylate or a mixture thereof.

4. The composition of claim 1 wherein expandable polymeric particles are made with acrylamide monomer.

5. The composition of claim 1 wherein the expandable polymeric particles comprise a copolymer of acrylamide and a C8-22 ester of acrylate or methacrylate.

6. The composition of claim 1, wherein the stable crosslinker is methylene bisacrylamide and the labile crosslinker is a diacrylate.

7. The composition of claim 1, wherein the expandable polymeric particles comprise a copolymer of acrylamide and lauryl methacrylate or stearyl methacrylate, the stable crosslinker comprises methylene bisacrylamide, and the labile crosslinker comprises a polyethylene glycol diacrylate.

8. A composition comprising highly crosslinked expandable hydrophilic polymeric particles being made with 0.1-5 wt % hydrophobic monomer and having an unexpanded volume average particle size diameter of from about 0.05 to about 10 microns and a crosslinking agent content of about 200,000 ppm weight of labile crosslinkers and about 300 ppm weight of stable crosslinkers, combined with a fluid comprising water.

9. The composition of claim 8, wherein the hydrophobic monomer comprises C8-C22 alkanes.

10. The composition of claim 8, wherein the hydrophobic monomer comprises a C8-22 ester of acrylate or methacrylate or a mixture thereof.

11. The composition of claim 8 wherein the expandable polymeric particles are made with acrylamide monomer.

12. The composition of claim 8 wherein the expandable polymeric particles comprise a copolymer of acrylamide and a C8-22 ester of acrylate or methacrylate.

13. The composition of claim 8, wherein the stable crosslinker is methylene bisacrylamide and the labile crosslinker is a diacrylate.

14. The composition of claim 8, wherein the expandable polymeric particles comprise a copolymer of acrylamide and a C8-22 ester of acrylate or methacrylate, the stable crosslinker comprises methylene bisacrylamide, and the labile crosslinker comprises a polyethylene glycol diacrylate.

15. The composition of claim 9, wherein the expandable polymeric particles comprise a copolymer of acrylamide and lauryl methacrylate or stearyl methacrylate, the stable crosslinker is methylene bisacrylamide, the labile crosslinker is polyethylene glycol diacrylate.

16. A method of increasing the recovery of hydrocarbon fluids in a subterranean formation, comprising injecting into the subterranean formation a composition comprising water, a highly crosslinked expandable hydrophilic polymeric particle being made with 0.1-5 wt % of a hydrophobic monomer containing a C8-C22 ester of acrylate or methacrylate or a mixture thereof, wherein:
  i) said polymeric particle has an unexpanded volume average particle size diameter of 0.05-10 microns and a crosslinker content of about 200,000 ppm weight of labile crosslinker and about 300 ppm weight of stable crosslinker,
  ii) said polymeric particle has a smaller diameter than the pore throats of the subterranean formation, and
  iii) said labile crosslinkers break under the conditions of temperature and pH in the subterranean formation to allow the polymeric particle to expand and form a hydrophobically associative polymer;
and recovering hydrocarbon fluids from said subterranean formation.

17. The method of claim 16, wherein the polymeric particle comprises a copolymer of acrylamide and lauryl methacrylate or stearyl methacrylate or a mixture thereof.

18. The method of claim 16, wherein the hydrophobic monomer is at least 0.5 weight %.

19. The method of claim 16, wherein the hydrophobic monomer is at least 1 weight %.

20. The method of claim 16, wherein the hydrophobic monomer is at least 1.5 weight %.

21. A method of increasing the recovery of hydrocarbon fluids in a subterranean formation comprising injecting the composition of claim 8 into a subterranean formation, allowing said labile crosslinkers to break, thus allowing allow the polymeric particle to expand and form a hydrophobically associative polymer, and recovering hydrocarbon fluids.

22. A composition comprising expandable polymeric particles being made with 0.1-5 wt % hydrophobic monomer and labile crosslinkers and stable crosslinkers, said particles combined with a fluid, wherein said polymeric particle has an unexpanded volume average particle size diameter of 0.05-10 microns.

23. The composition of claim 22, wherein the hydrophobic monomer comprises lauryl methacrylate or stearyl methacrylate or a mixture thereof 24. The composition of claim 22 wherein expandable polymeric particles are made with acrylamide monomer.

25. The composition of claim 22 wherein the expandable polymeric particles comprise a copolymer of acrylamide and a C8-22 ester of acrylate or methacrylate.

26. The composition of claim 22, wherein the stable crosslinker is methylene bisacrylamide and the labile crosslinker is a diacrylate.

* * * * *